US012123418B2

(12) United States Patent
Le Bot

(10) Patent No.: US 12,123,418 B2
(45) Date of Patent: Oct. 22, 2024

(54) COMPRESSION AND SEPARATION DEVICE AND COMPRESSION PROCESS

(71) Applicant: L'Air Liquide, Societe Anonyme pour l'Etude et l'Exploitation des Procedes Georges Claude, Paris (FR)

(72) Inventor: Patrick Le Bot, Champigny sur Marne (FR)

(73) Assignee: L'Air Liquide, Societe Anonyme Pour l'Etude et l'Exploitation des Procedes Georges Claude, Paris (FR)

( * ) Notice: Subject to any disclaimer, the term of this patent is extended or adjusted under 35 U.S.C. 154(b) by 340 days.

(21) Appl. No.: 17/629,434

(22) PCT Filed: Jul. 20, 2020

(86) PCT No.: PCT/FR2020/051310
§ 371 (c)(1),
(2) Date: Jan. 24, 2022

(87) PCT Pub. No.: WO2021/014086
PCT Pub. Date: Jan. 28, 2021

(65) Prior Publication Data
US 2022/0243982 A1 Aug. 4, 2022

(30) Foreign Application Priority Data

Jul. 24, 2019 (FR) ........................................ 1908371
Oct. 14, 2019 (FR) ........................................ 1911369
Nov. 27, 2019 (FR) ........................................ 1913329

(51) Int. Cl.
F04D 17/10 (2006.01)
B01D 53/00 (2006.01)
(Continued)

(52) U.S. Cl.
CPC ........... *F04D 17/10* (2013.01); *B01D 53/002* (2013.01); *F04D 29/705* (2013.01)

(58) Field of Classification Search
CPC ....... B01D 53/002; F04D 17/10; F04D 17/12; F25J 3/0655; F25J 3/069; F25J 2210/04; F25J 2230/04; F25J 2230/30
(Continued)

(56) References Cited

U.S. PATENT DOCUMENTS 3,551,106 A 12/1970 Smith et al.
3,992,167 A 11/1976 Beddome
(Continued)

FOREIGN PATENT DOCUMENTS

JP H0275882 3/1990

OTHER PUBLICATIONS

International Search Report and Written Report for PCT/FR2020/051310, mailed Oct. 16, 2020.

Primary Examiner — Frank M Lawrence, Jr.
(74) Attorney, Agent, or Firm — Justin K. Murray

(57) ABSTRACT

In a compression process in a dynamic compressor having at least one first and one second compression stages, a first gas having a first molecular weight of less than 10 g/mol is compressed, at least one second fluid having a second molecular weight greater than 50 g/mol is mixed with the first gas to form a third gas to be compressed having a molecular weight greater than 10 g/mol, the third gas is sent to the first compression stage, the third gas is cooled in a first heat exchanger downstream of the first compression stage, where it is partially condensed, the partially condensed third gas is sent to a first phase separator to form a fourth gas having a lower molecular weight than the third gas and a first condensed liquid having a higher molecular weight than the third gas, the fourth gas is sent from the first phase separator
(Continued)

to the second compression stage, the fourth gas compressed in the second compression stage is sent to cool in a second heat exchanger where it partially condenses, and the partially condensed fourth gas is sent to a second phase separator to produce a fifth gas having a lower molecular weight than the fourth gas.

12 Claims, 2 Drawing Sheets

(51) Int. Cl.
*F04D 29/70* (2006.01)
*F25J 3/06* (2006.01)

(58) Field of Classification Search
USPC .................................................. 95/39, 41, 42
See application file for complete search history.

(56) References Cited

U.S. PATENT DOCUMENTS

| 2009/0263316 | A1* | 10/2009 | Iyer .......................... C01B 3/386 |
| | | | 423/658.3 |
| 2012/0121497 | A1 | 5/2012 | Terrien et al. |
| 2019/0224611 | A1* | 7/2019 | Russell ................ B01D 53/047 |
| 2022/0290309 | A1* | 9/2022 | Wehrman ................ F04D 17/10 |
| 2022/0397118 | A1* | 12/2022 | Henzler .............. F04D 27/0269 |

* cited by examiner

COMPRESSION AND SEPARATION DEVICE AND COMPRESSION PROCESS

CROSS REFERENCE TO RELATED APPLICATIONS

This application is a § 371 of International PCT Application PCT/FR2020/051310, filed Jul. 20, 2020, which claims the benefit of FR1913329, filed Nov. 27, 2019, FR1908371, filed Jul. 24, 2019, and FR1911369, filed Oct. 14, 2019, all of which are herein incorporated by reference in their entireties.

FIELD OF THE INVENTION

The present invention relates to a compression and separation device, particularly for hydrogen gas, and to a compression process, particularly for hydrogen gas.

BACKGROUND OF THE INVENTION

Hydrogen is a gas with a very low molecular weight. The majority of hydrogen compressors used are therefore positive-displacement compressors, and are not dynamic compressors.

For compressing large volumetric flow rates of hydrogen, which is required for large capacity hydrogen liquefiers, positive-displacement compression is problematic, as it requires multiple compressors in parallel. This is because the cubic capacity of such compressors is limited.

Dynamic compressors (for example, centrifugal) have much larger cubic capacities and would be better suited to compressing the large volumetric flow rates desired. However, to achieve a high pressure ratio, a large number of compression stages in series is required.

Compressing hydrogen (molar mass 2 g/mol) between 6 and 25 bar using a single-shaft centrifugal compressor requires 8 compression stages in series. By way of comparison, compressing an air gas (nitrogen, for example, molar mass 28 g/mol) will require 3 stages to achieve the same compression ratio.

It is possible to compress a light gas such as hydrogen by increasing the molar mass of the gas to be compressed by mixing with a heavier gas. However, this ballast gas compressed end-to-end with the hydrogen considerably increases the power required to compress the same quantity of hydrogen.

For example, hydrogen (2 g/mol) can be mixed with $CO_2$ (44 g/mol). A mixture of 60% $CO_2$+40% $H_2$ will have a molar mass similar to that of nitrogen and will therefore also require 3 compression stages for the same.

However, the consumption will be 1/0.4=2.5 times greater than compression without the addition of ballast gas.

The use of compounds even heavier than $CO_2$, such as Freons® for example, is also known (JPH0275882). Such compounds are compressed entirely with the light gas from the suction pressure to the discharge of the last stage, but their high molecular weight minimizes the quantity to be added and therefore the additional energy cost.

SUMMARY OF THE INVENTION

Certain embodiments of the proposed invention makes it possible to use a dynamic compressor to compress hydrogen while minimizing the energy loss associated with the use of a heavy gas.

According to one object of the invention, a compression and separation device is provided, comprising a dynamic compressor having first and second compression stages for compressing a first gas having a first molecular weight less than 10 g/mol, or even less than 7.5 g/mol, or even less than 5 g/mol, comprising:

i. An inlet for the first gas,
ii. Means for mixing at least one second fluid having a second molecular weight greater than 50 g/mol with the first gas to form a third gas to be compressed having a molecular weight greater than 10 g/mol,
iii. Means for sending the third gas to the first compression stage, a first heat exchanger for cooling the third gas downstream of the first compression stage in order to partially condense it, a first phase separator, means for sending the partially condensed third gas to the first phase separator to form a fourth gas having a lower molecular weight than the third gas and a first condensed liquid having a higher molecular weight than the third gas,
iv. Means for sending the fourth gas from the first phase separator to the second compression stage, a second heat exchanger downstream of the second compression stage, means for sending the compressed fourth gas to the second compression stage and cooling it in the second heat exchanger in order to partially condense it, a second phase separator and means for sending the partially condensed fourth gas to the second phase separator to produce a fifth gas having a lower molecular weight than the fourth gas and a second condensed liquid having a higher molecular weight than the fourth gas, and
v. A separation device and means for sending the fifth gas or a gas derived from the fifth gas to the separation device to be separated therein to produce a gaseous product having a molecular weight of less than 10 g/mol, or even less than 7.5 g/mol, or even less than 5 g/mol, and a composition of less than 10 ppm, or even less than 5 ppm, or even less than 1 ppm of any component having a molecular weight greater than 50 g/mol.

According to other optional aspects:
the device comprises means for recovering the first condensed liquid and/or the second condensed liquid, these means optionally comprising a common reservoir, and means for mixing the first and/or second condensed liquid with the first gas optionally after vaporization.
the device comprises means for at least partially vaporizing the first and/or second condensed liquid and means for at least partially recycling the vaporized portion as a second fluid.
the device comprises means for using some of the heat generated by compression to vaporize the first and/or second condensed liquid.
the first and/or second phase separator is not thermally insulated from the ambient air.

According to another object of the invention, a compression process is provided in which a dynamic compressor having at least one first and one second compression stages in which a first gas having a first molecular weight of less than 10 g/mol, or even less than 7.5 g/mol, or even less than 5 g/mol, is compressed, at least one second fluid having a second molecular weight greater than 50 g/mol is mixed with the first gas to form a third gas to be compressed having a molecular weight greater than 10 g/mol, the third gas is sent to the first compression stage, the third gas is cooled in a first heat exchanger downstream of the first compression stage, where it is partially condensed, the partially condensed third gas is sent to a first phase separator operating at a temperature greater than −50° C. to form a fourth gas having a lower molecular weight than the third gas and a first condensed liquid having a higher molecular weight than the third gas, the fourth gas is sent from the first phase separator sent to the second compression stage, the fourth gas compressed in the second compression stage is sent to cool in a second heat exchanger where it partially condenses, the partially condensed fourth gas is sent to a second phase separator operating at a temperature greater than −50° C. to produce a fifth gas having a lower molecular weight than the fourth gas and a second condensed liquid having a higher molecular weight than the fourth gas.

One gas can be derived from another gas by separating the gas into two portions with identical compositions, by separating it by distillation, adsorption or permeation.

According to other optional aspects:
the first condensed liquid and/or the second condensed liquid is/are recovered, optionally in a common reservoir, and the first and/or second condensed liquid is/are mixed with the first gas optionally after vaporization.
the first and/or second condensed liquid is at least partially vaporized and the vaporized portion is at least partially recycled as a second fluid.
in the compression and separation process comprising a compression process as described above, the fifth gas or a gas derived from the fifth gas is sent to a separation device to be separated therein to produce a gaseous product having a molecular weight of less than 10 g/mol, or even less than 7.5 g/mol, or even less than 5 g/mol, and a composition of less than 10 ppm, or even less than 5 ppm, or even less than 1 ppm of any component having a molecular weight greater than 50 g/mol.
the separation device also produces a gas having a molecular weight greater than 10 g/mol, or even greater than 7.5 g/mol, or even greater than 5 g/mol, and a composition of more than 10 ppm, or even more than 5 ppm, or even more than 1 ppm of any component having a molecular weight greater than 50 g/mol, and this gas is sent upstream of the compressor to be compressed therein with the first gas.

Here, multi-stage compression of a low molecular weight gas (<10 g/mol; 7.5 g/mol; 5 g/mol) is proposed, characterized by:
Mixing before compression with a high molecular weight component or mixture of components (>25 g/mol; >35 g/mol; >50 g/mol) to form a gas to be compressed having a molecular weight >10 g/mol.
Multi-stage compression of this gas in a dynamic compressor comprising at least one intermediate cooling step.
Forming a condensed phase rich in high molecular weight components and a gas phase depleted in high molecular weight components during the intermediate cooling step.
Recovering the condensates and compression in a subsequent stage of the vapor phase enriched in low molecular weight components.
Pooling the condensates and recycling upstream of the compressor.
At the outlet of the last compression stage and after final cooling and condensing, the gas phase is sent to a separation unit, in which:

The low molecular weight gas is produced under pressure and with a content of high molecular weight components <10 ppm (<5 ppm; <1 ppm).
The high molecular weight components are recovered and recycled upstream of the compressor.

With a judicious choice of the high molecular weight component(s) added, depending on the operating conditions of the compressor ($P_{inlet}$, $P_{outlet}$), etc., the energy loss is very significantly reduced compared to the prior art.

Example: Compression of hydrogen from 1 to 25 bar in 8 stages, the penalty is reduced to 26% by incorporating $CH_2Cl_2$, compared with 150% with the $CO_2$ cycle (noncondensable).

To compress 100,000 $Nm^3/h$ of hydrogen from 6 bar to approximately 51 bar, the final pressure value can be calculated by adopting identical hypotheses for all of the compression stages, namely:
Adiabatic efficiency=85%
Pressure drop between each compression stage=0.1 bar
Polytropic head: 100 kJ/kg
Recondensation temperature: 40° C.

It can be seen that compared to compression in a positive-displacement compressor of the prior art:
A centrifugal compressor for pure hydrogen would have a very large number of stages (approximately 35) and would therefore be very costly and have a very large footprint.
Increasing weight with a noncondensable second fluid, $CO_2$ at 44 g/mol, to form a 12 g/mol mixture, makes it possible to compress in five stages, but has a significant energy penalty.
Increasing weight with a second fluid to obtain a 12 g/mol mixture (at the compression stage inlet) that is partially condensed according to the invention makes it possible to minimize the energy loss, while remaining within a reasonable number of compression stages.
Increasing weight with a second fluid to form a 17 g/mol mixture (at the stage inlet) that is partially condensed according to the invention makes it possible to compress in the same number of stages as with the 12 g/mol mixture with $CO_2$, and also minimizes the energy loss.

Table 1 corresponds to a case in which the $H_2$/other separation efficiency is 100% and one in which this efficiency drops to 80%. It will simply be noted that the energy consumption of the "mixture" solutions is penalized by this efficiency. (Here, 1/0.8=125%).

TABLE 1

|  | $H_2$ | $H_2$ | $H_2$ + $CO_2$ | $H_2$ + Condensable | $H_2$ + Condensable |
|---|---|---|---|---|---|
| 100% separation efficiency |  |  |  |  |  |
| % $H_2$ | 100 | 100 | 76.22 | 86.23 | 76.96 |
| Molar Mass $H_2$ | 2 | 2 | 2 | 2 | 2 |
| $Q_{total}$ ($Nm^3/hr$) | 100,000 | 100,000 | 131,200 | 116,000 | 130,000 |
| $Q_{H2}$ ($Nm^3/hr$) | 100,000 | 100,000 | 100,001 | 100,027 | 100,048 |
| % balance | 0 | 0 | 23.78 | 13.77 | 23.04 |
| Molar Mass Balance |  |  | 44 | 74.5 | 67.62 |
| Molar Mass of Mixture | 2 | 2 | 12 | 12 | 17.1 |

TABLE 1-continued

|  | $H_2$ | $H_2$ | $H_2$ + $CO_2$ | $H_2$ + Condensable | $H_2$ + Condensable |
|---|---|---|---|---|---|
| $P_{inlet}$ | 6 | 6 | 6 | 6 | 6 |
| $P_{outlet}$ | 52 | 52 | 50.65 | 51.55 | 50.74 |
| kW (energy) | 8,628 | 9,979 | 11,525 | 9,883 | 10,783 |
|  |  | 116% | 134% | 115% | 125% |
| Number of centrifugal stages 80% separation efficiency | Positive Displacement | 34-36 | 5 | 8 | 5 |
| % $H_2$ | 100 | 100 | 76.22 | 86.23 | 76.5 |
| Molar Mass $H_2$ | 2 | 2 | 2 | 2 | 2 |
| $Q_{total}$ (Nm³/hr) | 100,000 | 100,000 | 164,000 | 145,000 | 163,600 |
| $Q_{H2}$ (Nm³/hr) | 100,000 | 100,000 | 125,001 | 125,034 | 125,154 |
| % balance | 0 | 0 | 23.78 | 13.77 | 23.5 |
| Molar Mass Balance |  |  | 44 | 74.5 | 67.62 |
| Molar Mass of Mixture | 2 | 2 | 12 | 12 | 17.4 |
| $P_{inlet}$ | 6 | 6 | 6 | 6 | 6 |
| $P_{outlet}$ | 52 | 52 | 50.43 | 51.62 | 51.36 |
| kW (energy) | 8,628 | 9,979 | 14,349 | 12,338 | 13,605 |
|  |  | 116% | 166% | 143% | 158% |
| Number of centrifugal stages | Positive Displacement | 34-36 | 5 | 8 | 5 |
| Penalty vs 100% separation efficiency |  | 124.5% | 124.8% | 126.2% | 125% |

BRIEF DESCRIPTION OF THE DRAWINGS

These and other features, aspects, and advantages of the present invention will become better understood with regard to the following description, claims, and accompanying drawing(s). It is to be noted, however, that the drawing(s) illustrate only several embodiments of the invention and are therefore not to be considered limiting of the invention's scope as it can admit to other equally effective embodiments.

DETAILED DESCRIPTION OF THE INVENTION

Figure 1:
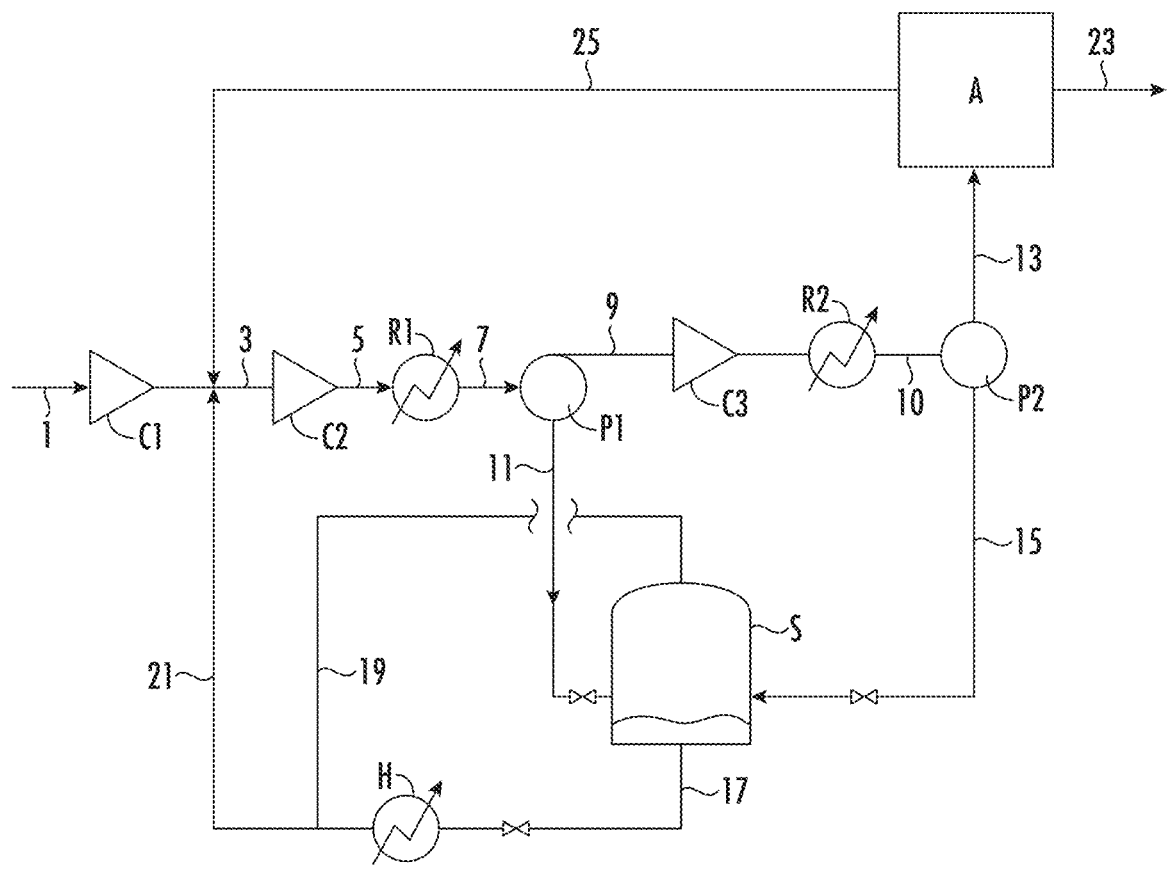
FIG. 1 represents a process according to the invention.

In FIG. 1, a first gas having a first molecular weight less than 10 g/mol, or even less than 7.5 g/mol, or even less than 5 g/mol, for example hydrogen or helium 1, is compressed in a compressor stage C1. After being mixed with a gas 21 having a second molecular weight that is greater than 50 g/mol and optionally with a gas 25 also having a second molecular weight that is greater than 50 g/mol, it forms a gas mixture having a third molecular weight that is greater than 10 g/mol. The gas 21 can for example be dichloromethane ($CH_2Cl_2$).

The gas 21 can be replaced by a liquid. In this case, the liquid 21 is injected into the first gas in aerosol form.

The first gas has a first main component and the second fluid optionally has a second main component, in each case the main component preferably comprises 50 mol %, or even 80 mol %, or even 90 mol %, or even 95 mol % of the gas.

It can optionally also be mixed with a gas 25. The mixture 3 having a molecular weight greater than 10 g/mol, or even greater than 15 g/mol, is compressed in a dynamic compressor stage C2 to form a compressed gas 5, and the compressed gas is cooled in a cooler R1 to partially condense it. The partially condensed flow 7 is separated in a phase separator P1. The gas 9 from the phase separator P1, enriched in the first main component and optionally depleted in the second main component, is compressed in a dynamic compressor stage C3 and cooled by a cooler R2 for another partial condensation step. The partially condensed flow 10 is separated in a phase separator P2.

The gas 13 from the phase separator P2, enriched in the first main component and optionally depleted in the second main component, is separated to produce a produced gas 23 having the same main component as the first gas, being able to be as pure in this component as the first gas, more pure in this component than the first gas, or less pure in this component than the first gas. The gas 13 is enriched in the first main component and optionally depleted in the second main component compared to the gas 13 and compared to the gas 10.

The first gas 1 and the produced gas 23 contain at least 80 mol % of a first component, or even at least 90 mol %, or even at least 95 mol %.

The produced gas 23 and preferably the gas 13, or even the gas 10, have a molecular weight of less than 10 g/mol, or even less than 7.5 g/mol, or even less than 5 g/mol.

The separation of the gas 23 in the device A can be carried out by any suitable means, such as distillation, absorption, adsorption, permeation, scrubbing or a combination of several of these techniques.

The gas 25 produced by the device A contains a mixture of the first gas and the second fluid and can be recycled upstream of the compression stage C2 so that none of the two fluids is lost.

Whatever gases are mixed with the gas 1, the important aspect is that the mixture 3 entering the compression stage C2 has a higher molecular weight than the gas 1.

The liquid 15 from the phase separator P2 enriched in the second main component and depleted in the first main component compared to the gas 10 is expanded and sent to a storage tank S. This storage tank also receives the expanded liquid 11 from the first phase separator P1, which is enriched in the second main component and depleted in the first main component compared to the gas 7.

The two phase separators P1, P2 operate at temperatures above −50° C., or even above −20° C., or even above 0° C., or even above ambient temperature. Depending on the operating temperature, they can be exposed without insulation.

The liquid 17 from the storage tank is expanded, heated by the heater H to vaporize it and sent as gas 21 to modify the molecular weight of the gas 1. The head gas from the storage tank 19 can also be mixed downstream of the heater H.

Figure 2:
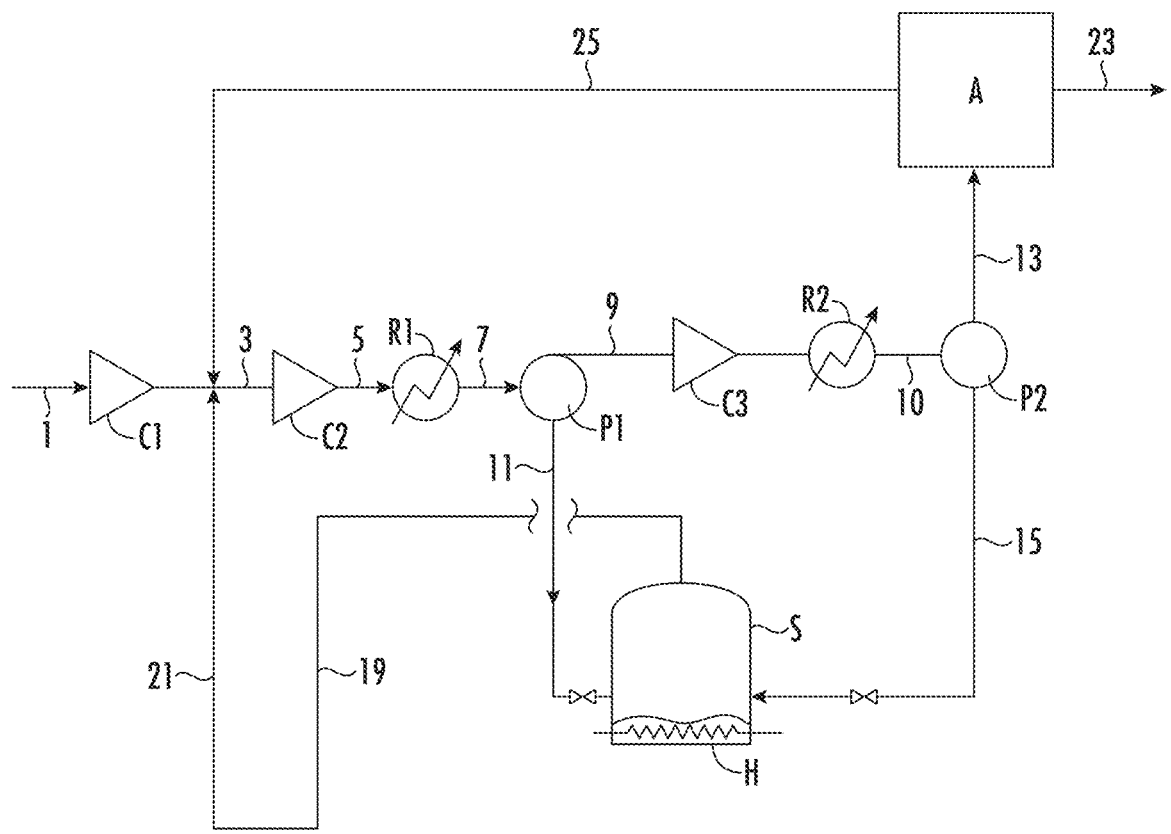
FIG. 2 represents a process according to the invention.

Another possibility, shown in FIG. 2, is to incorporate the heater H into the storage tank S to vaporize the liquids 11, 15 accumulated in the storage tank S, so that only the gas 19 is recycled as gas 21 mixed with the gas 1.

Preferably, at least some of the compression heat from the first gas 1 is recovered to heat the liquid(s) 11, 15. The heater H and the coolers R1 and/or R2 can thus be connected to each other or even form part of a single heat exchanger.

The stages C2, C3 or even C1 are dynamic, or even centrifugal, compression stages.

Preferably, the storage tank S in the two figures operates at temperatures above −50° C., or even above −20° C., or even above 0° C., or even above ambient temperature. Depending on the operating temperature, it can be exposed without insulation.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

"Comprising" in a claim is an open transitional term which means the subsequently identified claim elements are a nonexclusive listing (i.e., anything else may be additionally included and remain within the scope of "comprising"). "Comprising" as used herein may be replaced by the more limited transitional terms "consisting essentially of" and "consisting of" unless otherwise indicated herein.

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

All references identified herein are each hereby incorporated by reference into this application in their entireties, as well as for the specific information for which each is cited.

The invention claimed is:

1. A compression and separation device, comprising a dynamic compressor having first and second compression stages for compressing a first gas having a first molecular weight less than 10 g/mol:
   a. an inlet for the first gas;
   b. means for mixing at least one second fluid having a second molecular weight greater than 50 g/mol with the first gas to form a third gas to be compressed having a molecular weight greater than 10 g/mol;
   c. means for sending the third gas to the first compression stage, a first heat exchanger for cooling the third gas downstream of the first compression stage in order to partially condense it, a first phase separator, means for sending the partially condensed third gas to the first phase separator to form a fourth gas having a lower molecular weight than the third gas and a first condensed liquid having a higher molecular weight than the third gas;
   d. means for sending the fourth gas from the first phase separator to the second compression stage, a second heat exchanger downstream of the second compression stage, means for sending the compressed fourth gas to the second compression stage and cooling it in the second heat exchanger in order to partially condense it, a second phase separator and means for sending the partially condensed fourth gas to the second phase separator to produce a fifth gas having a lower molecular weight than the fourth gas and a second condensed liquid having a higher molecular weight than the fourth gas; and
   e. a separation device and means for sending the fifth gas or a gas derived from the fifth gas to the separation device to be separated therein to produce a gaseous product having a molecular weight of less than 10 g/mol, and a composition of less than 10 ppm of any component having a molecular weight greater than 50 g/mol.

2. The device as claimed in claim 1, comprising means for recovering the first condensed liquid and/or the second condensed liquid, and further comprising means for mixing the first and/or second condensed liquid with the first gas.

3. The device as claimed in claim 2, said means for recovering comprising a common reservoir.

4. The device as claimed in claim 2, comprising means for at least partially vaporizing the first and/or second condensed liquid and means for at least partially recycling the vaporized portion as a second fluid.

5. The device as claimed in claim 1, comprising means for using some of the heat generated by compression to vaporize the first and/or second condensed liquid.

6. The device as claimed in claim 1, in which the first and/or second phase separator is not thermally insulated from the ambient air.

7. A compression process in a dynamic compressor having at least one first and one second compression stages, the process comprising the steps of:
   compressing a first gas having a first molecular weight of less than 10 g/mol;
   mixing at least one second fluid having a second molecular weight greater than 50 g/mol with the first gas to form a third gas to be compressed having a molecular weight greater than 10 g/mol;
   sending the third gas to the first compression stage;
   cooling the third gas in a first heat exchanger downstream of the first compression stage, where the third gas is partially condensed;
   sending the partially condensed third gas to a first phase separator operating at a temperature greater than −50° C. to form a fourth gas having a lower molecular weight than the third gas and a first condensed liquid having a higher molecular weight than the third gas, the fourth gas is sent from the first phase separator to the second compression stage;
   sending the fourth gas compressed in the second compression stage to cool in a second heat exchanger where it partially condenses; and
   sending the partially condensed fourth gas to a second phase separator operating at a temperature greater than −50° C. to produce a fifth gas having a lower molecular weight than the fourth gas and a second condensed liquid having a higher molecular weight than the fourth gas.

8. The process as claimed in claim 7, wherein the first condensed liquid and/or the second condensed liquid are recovered, optionally in a common reservoir, and the first and/or second condensed liquid is mixed with the first gas optionally after vaporization.

9. The process as claimed in claim 7, wherein the first and/or second condensed liquid is at least partially vaporized and the vaporized portion is at least partially recycled as the second fluid.

10. The process as claimed in claim 7, wherein the first gas is hydrogen.

11. A compression and separation process comprising a compression process as claimed in claim 7, in which the fifth gas or a gas derived from the fifth gas is sent to a separation device to be separated therein to produce a gaseous product having a molecular weight of less than 10 g/mol, or even less than 7.5 g/mol, or even less than 5 g/mol, and a composition of less than 10 ppm, or even less than 5 ppm, or even less than 1 ppm of any component having a molecular weight greater than 50 g/mol.

12. The process as claimed in claim 11, wherein the separation device also produces a gas having a molecular weight greater than 10 g/mol, or even greater than 7.5 g/mol, or even greater than 5 g/mol, and a composition of more than 10 ppm, or even more than 5 ppm, or even more than 1 ppm of any component having a molecular weight greater than 50 g/mol, and this gas is sent upstream of the compressor to be compressed therein with the first gas.

\* \* \* \* \*